United States Patent [19]

Volk

[11] 4,038,501

[45] July 26, 1977

[54] APPARATUS AND METHOD FOR AUTOMATICALLY CONNECTING TO THE INDIVIDUAL CONDUCTORS OF A MULTICONDUCTOR CABLE

[76] Inventor: Victor F. Volk, 646 Snug Harbor Drive, Boynton Beach, Fla. 33435

[21] Appl. No.: 594,691

[22] Filed: July 10, 1975

[51] Int. Cl.² ............................................. H04B 3/46
[52] U.S. Cl. ........................ 179/175.3 R; 339/151 B; 324/66; 179/175.3 A
[58] Field of Search ................. 179/175.3 R, 175.3 A, 179/175; 324/66, 158 F; 339/147 P, 150 B, 151 B

[56] References Cited

U.S. PATENT DOCUMENTS

| 3,560,907 | 2/1971 | Heller | 324/158 F |
| 3,654,585 | 4/1972 | Wickersham | 339/151 B |
| 3,806,800 | 4/1974 | Bove et al. | 324/66 |
| 3,914,561 | 10/1975 | Schardt et al. | 179/175.3 A |

OTHER PUBLICATIONS

"Automatic Testing System for Telephone Cables" by Tsukamoto et al. Sumitomo Electric Technical Review, No. 15, Aug. 1971, pp. 32–35.

Primary Examiner—Douglas W. Olms

[57] ABSTRACT

The individual conductors of a multiconductor cable are connected to a panel board for testing, without being separated from each other, by producing a very smooth end section of the cable, locating the positional coordinates of each conductor end in a computer memory and pressing a grid of wires that have been preconnected to the panel board against the cable section. Wires in the grid that do not center on one of the conductors are first pushed back under direction of a computer.

13 Claims, 9 Drawing Figures

APPARATUS AND METHOD FOR AUTOMATICALLY CONNECTING TO THE INDIVIDUAL CONDUCTORS OF A MULTICONDUCTOR CABLE

BACKGROUND OF THE INVENTION

This invention has particular utility for testing telephone cables that contain large numbers of conductor pairs although it will also have application where multiconductor cables, including cables other than telephone cables, require splicing for purposes other than testing. After a cable has been manufactured it is necessary to test each of the conductors for continuity and shorting and it is also desirable to perform 100% testing for other electrical properties such as conductor resistance, capacitance, cross-talk, and insulation dielectric strength. When it is considered that cables are being sold with as many as 3600 pairs, it will be appreciated that a significant fraction of the cost of manufacturing such cables resides in the labor spent for testing the completed product. For this reason computerized automated testing is now widely applied whereby the switching of each of the conductors into a sequence of test circuits and a print-out of the results may be accomplished with a minimum of direct labor. This known automated testing apparatus, however, still requires that the ends of the cables be stripped of their jackets and armor or shielding, and that the individual conductors be spread out and separated from one another and connected by hand to the clips of a panel board. Much of the potential advantage of computerized testing as now practiced is not realized because of the continuing need for manual labor to connect the individual conductors of cables under test.

SUMMARY OF THE INVENTION

I have invented an apparatus and method for making connections to the individual insulated conductors of a multiconductor cable without separating the individual conductors from one another. My apparatus comprises clamping means for holding an end section of a bundle comprising a large plurality of the insulated conductors in a fixed position relative to elements of my apparatus and a grid that comprises a plurality of conductors electrically separated from one another and a substantially planar end section defining a coordinate system at least equal in size to the section of the bundle. The number of conductors within the grid substantially exceeds the number of conductors within the bundle section. My apparatus also comprises automatic means such as a photoelectric senser for determining the coordinates in the aforesaid system of the end section of each of the conductors in the bundle and computer means for storing these coordinates. In addition my apparatus comprises means, such as plunger means and means for urging the plunger means against the grid conductors, that are controlled by the computer means, for selectively removing individual conductors of the grid from the grid end section and means for bringing together the end section of the conductor bundle and the planar section of the grid so as to electrically connect each of the conductors of the bundle to a conductor of the grid. Advantageously my apparatus will comprise means for locking the conductors of the grid against removal from the end section of the grid and means, such as means comprising a source of fluid pressure, for returning to the end section such conductors that have been removed therefrom. The conductors of my grid may each advantageously comprise a tubular portion surrounding a length of wire that is longitudinally displaceable relative to the remainder of the conductor and an opening in the tubular portion communicating with a source of fluid pressure.

In the method of my invention I prepare a smooth section in at least an area of the cable, a fractional area being chosen where the entire cable section would be too large for the available grid section area. This smooth section will include the smooth ends of a large plurality of the cable conductors. I determine the position of each of the conductor ends within this area, advantageously with a photoelectric senser, and store the coordinates of these positions in a computer memory. From the planar end section of a conductor grid which comprises a plurality of wire contact points exceeding the number of conductor ends in the area above mentioned, I remove, under control of the computer, an excess of these contact points from the planar end section of the grid so as to leave one wire contact point opposed to each of the smooth ends of the conductors in the area. This may advantageously be done by pushing back the points seriatim. Thereafter I bring the grid and the cable section together thus electrically contacting each of the conductor ends with a wire contact point. My method may also embody a step of immersing the cable area in an encapsulating liquid and hardening the liquid prior to completing the preparation of the smooth section.

BRIEF DESCRIPTION OF THE DRAWING

FIGS. 1a–1f show side views of the apparatus of my invention and depict a sequence of steps in the practice of my method.

DETAILED DESCRIPTION OF A PREFERRED EMBODIMENT

Figure 1D:
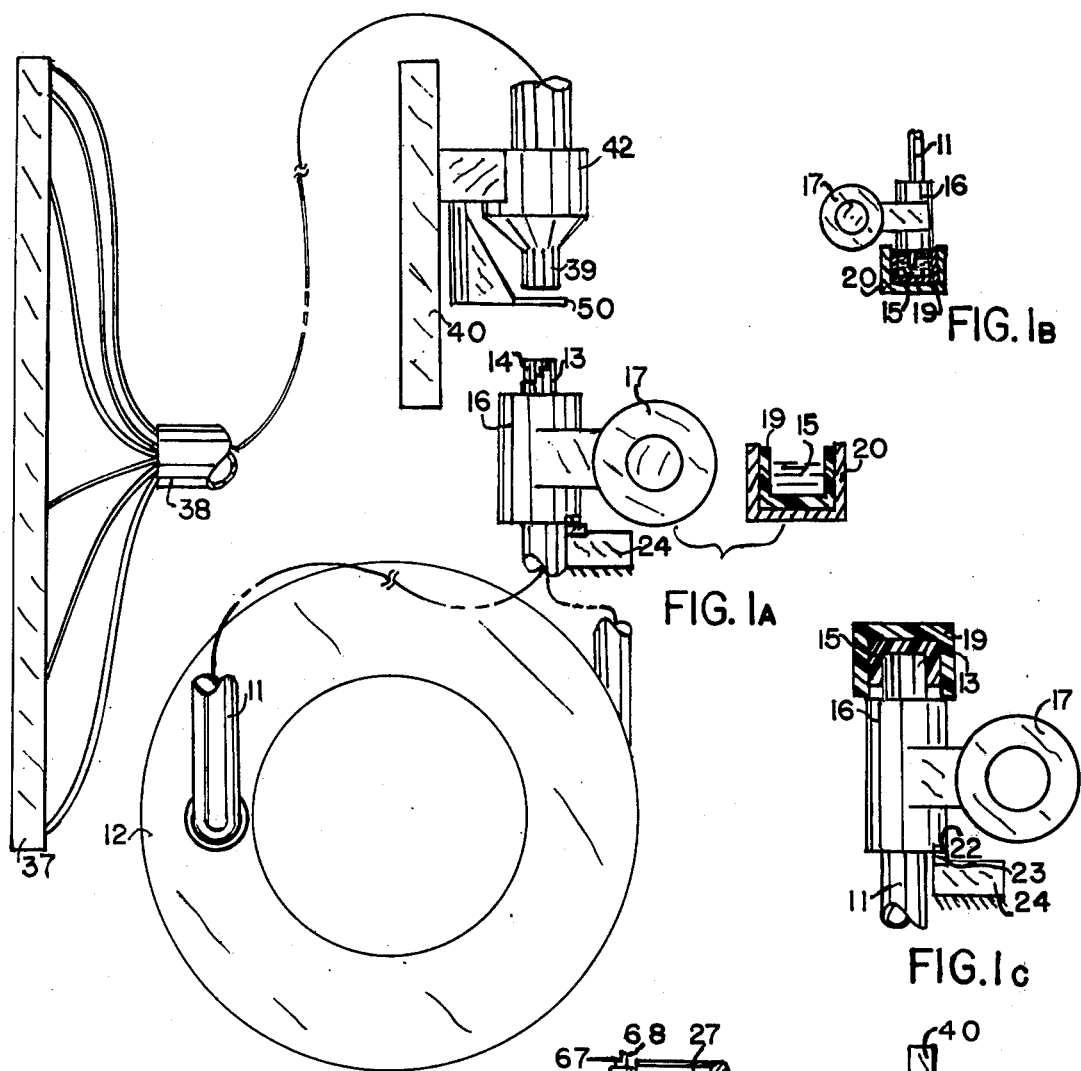

As illustrative of the method and apparatus of my invention I have shown them in the drawing as applied to the testing of shielded, jacketed cable which (for example) might be a 50 pair Awg No. 19 telephone cable 11, wound on a reel 12 with an inner end 13 of the cable being brought out for testing in the usual manner through an opening in the reel flange, and the outer end 14 available from the top layer on the reel. I have illustrated an embodiment in which both ends of the cable are, by conventional methods, stripped for testing, although, in practice the individual conductors at one end, only, of the cable may be connected for testing with the conductors of the other end all being shorted together, insulated from one another or interconnected in a known manner through a high resistance medium. Additionally, although, for the sake of simplicity, I have illustrated my invention by an example wherein the entire 50 pairs of conductors of the cable constitute a bundle being connected, my invention can be used to test lesser or greater numbers of conductors as, for example, 25 pairs selected from a 200cable.

Figure 1D:
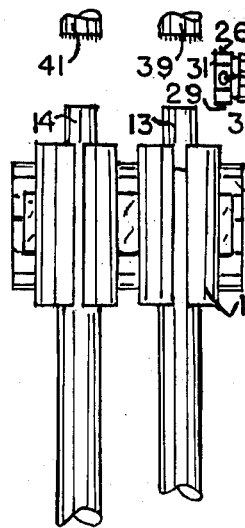

The cable ends 13, 14 are immovably gripped in a clamp 16 to project a short distance d. The clamp 16 is rigidly mounted on a heavy journal 17. A disposable container 19 for an encapsulating resin 15 such as an epoxy resin is positioned in a holder 20 to receive the ends 13, 14 to a preselected distance below a surface 21 of the resin upon rotation of the journal 17 as shown in FIG. 1 *b*. The viscosity of the resin 15 in the container 19 should be sufficiently low to penetrate or wick into the ends 13, 14 for a distance of 1/2 to 1 inch (12.7–25.4mm). To facilitate rapid curing of the resin heat may be applied as by infra-red lamps, not shown. Instead of epoxy, a hot-melt encapsulant with sufficiently dielectric properties may also be used as may other cure type encapsulants of known compositions. A hot-melt encapsulant or an encapsulant that can be removed by solvent action has the advantage that the ends of any defective conductors can be made available for sleeving. When the encapsulant has hardened sufficiently the clamp is rotated back to its original position as illustrated in FIG. 1*c*. This position is determined to high precision by means of a polished flat 22 on the clamp 16 coming to rest on a matching flat 23 of an anvil 24. A shaping tool 26 on a tool carrier 27 of a shaping machine cuts a planar surface 28 on the ends 13, 14 following which a diamond tool 29 refines this surface to a smooth polished finish. Although I prefer diamond for the tool 29, other superhard tools such as boron carbide may be used as may a polishing wheel. However a turret type head 31 on the tool carrier 27 provides a fast, convenient means, capable of 100% automation, for preparing the surface of the cable ends without other grinding or polishing. This head 31 also provides means for positioning a photocell 32 which I have fastened to the turret 31 for a purpose that I shall describe.

Although I have mounted the clamp 16 on a journal 17 for the purpose, as hereinabove described, of encapsulating the cable ends, under certain circumstances the journal mounting and encapsulating step may be omitted. Encapsulation is necessary where the insulation of the individual conductors is porous and has the advantage that stiff outer shielding or sheathing layers of the cable need not be removed but can be machined down flush with the conductors during the shaping step. In the absence of encapsulation the outer shielding or sheathing of the cable (indicated by the numeral 30 in FIG. 2) would constitute an obstruction preventing sufficiently firm gripping of the conductors by the clamp to prevent their shifting within the coordinate system of the apparatus during the tests, or during the step of making connection. Such shifting must, by all means, be avoided. Where, however the conductors are insulated with solid walls of plastic insulation and are not surrounded by a stiff outer layer, either because this layer has been stripped from the cable prior to clamping, or because the particular bundle of conductors under test is not stiffly sheathed, the encapsulating step may be omitted and the journal mounting will be needed. In this case the conductor bundle will be clamped under higher pressure than is required for encapsulated cables with the high pressure being evenly distributed by means of a resilient wrapping, not shown, around the conductors.

Figure 2:
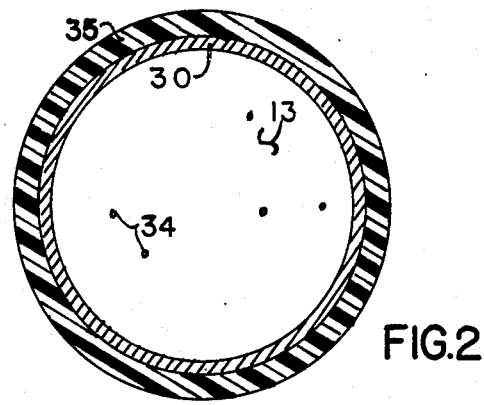
FIG. 2 shows a smoothed end section of a cable to be connected in accordance with my invention.

The photocell 32, which incorporates a source of illumination, is connected to a computer 33 for locating cut ends 34 of each of the conductors in the cable ends 13, 14 in a coordinate system. FIG. 2 showing the cut ends 34 also depicts cable shielding 30 and jacket 35 which need not, contrary to prior art practice, be removed in the practice of my invention.

The coordinate system incorporates, and the computer 33 controls, the coordinates of an automated, computer connected shaping machine, of which only the tool carrier 27 is shown in the drawing. Coordinates of center points 36 of the ends 34 are stored in the computer memory after being calculated from the photocell data. Different methods of programming the calculation of the points 36 are available, but, since the conductors are all circular in section, their centers can be calculated from three points on their circumferences. The carrier 27 makes a series of lateral passes over the ends 13, 14 at spacings somewhat less than half the conductor diameter. In the illustrated embodiment for No. 19 Awg (0.036 inch), (0.915mm) conductors I make the passes at 0.015 inch (0.382mm) intervals across the areas occupied by both of the ends 13 and 14.

Figure 3:
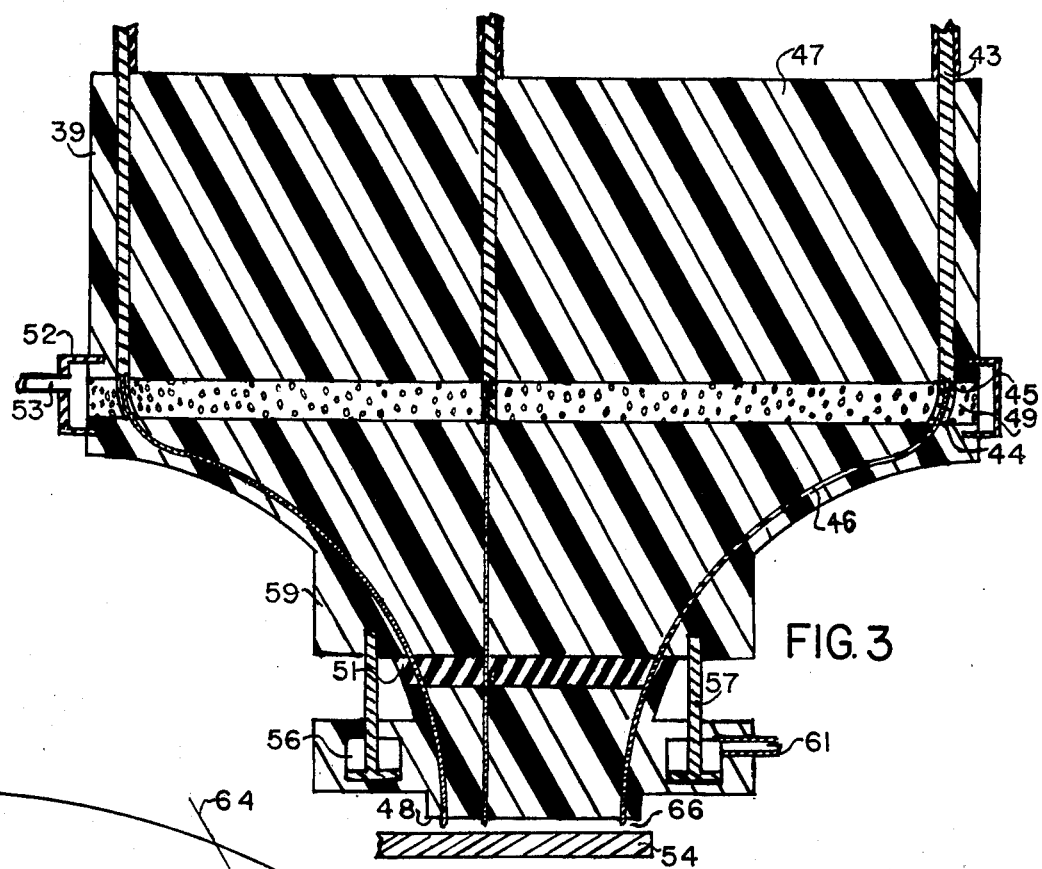
FIG. 3 shows a section of the grid block 39 of FIGS. 1a and 1f.

It is desired to connect each of the conductor ends 34 to a panel board 37 (FIG. 1*a*) for automatic testing. Automatic testing has been practiced in the telephone cable industry using panel boards of the general type of board 37 but with the important disadvantage that connection of the cable conductors to the panel board has had to be made by hand. In my apparatus, however, the panel board has been permanently preconnected by means of a large multiconductor cable 38 to a grid block 39 (FIG. 3). Where, as in the illustrated embodiment, the individual conductors are to be connected at both ends of each cable, my apparatus has a second grid block 41 (FIG. 1*d*) identical to the block 39. The blocks 39, 41 are precisely positioned by a rigid support 42, mounted to be vertically movable on a fixed member 40 so that it can be lowered upon the ends 13, 14 thereby connecting these ends to the board 37. The grid blocks 39, 41 are formed of a dielectric material of high abrasion resistance and rigidity into which are embedded a large number of conductors 43 whose ends 44 have been precisely bored out for a short distance such, for example, as 0.05 inches (0.127 mm) to receive a like number of hard springy wires 46 in a slide, electrically conductive, fit. In the drawing (FIG 3) the conductors 43, conductor ends 44 and wires 46 are shown oversize, for clarity. At the top of each of the bores in the ends 44 I have drilled three small holes 45 through the walls of the conductors for receiving a hydraulic fluid, as shall be explained. The block 39 has an upper portion 47 of large area sufficient to accomodate the plurality of conductors 43 with sufficient insulation being provided by the dielectric material of the block around each conductor. The block tapers toward its lower end to a surface 48 not necessarily substantially greater in area than is required to match the area of one of the ends 13, 14. Although I have described the element 39 as a block, it will be understood that it is not necessarily a homogeneous solid and may be conveniently constructed of a large number of horizontal plates of the dielectric material. In any event it is advantageous, as in the illustrated embodiment, to provide an openly porous dielectric layer 49 and a dielectric resilient layer 51 within the block 39. The porous layer 49 is surrounded by a manifold 52 supplied with a dielectric hydraulic fluid through tubing 53 from a source, not shown. The layer 49 is so positioned that all the holes 45 open into the porous area and have access to the hydraulic fluid. When pressure is applied to this fluid the wires 46 are urged downward until they reach plate 54 positioned a short distance such as 15 mils (0.038 mm) below the surface 48. It will be understood that no great pressure of the hydraulic fluid is required to urge the wires 46 downward since they have only overcome the sliding friction within the block. This friction is sufficient, however, to maintain the wires in place in the absence of any other force than their own weight. The portion of the block 39 beneath the layer 51 is broadened into an extended ring 56 to contain pneumatic chambers 57 for pistons 58 that are firmly anchored in a cooperating ring 59 in the portion of the block 39 above the layer 51. Pressurized air or other fluid introduced into the chambers 57 through tubing 61 has the effect of compressing the later 51 sufficiently to prevent the wires 46 from sliding in the block 39 without having made sufficient electrical contact with the ends 34.

Figure 4:
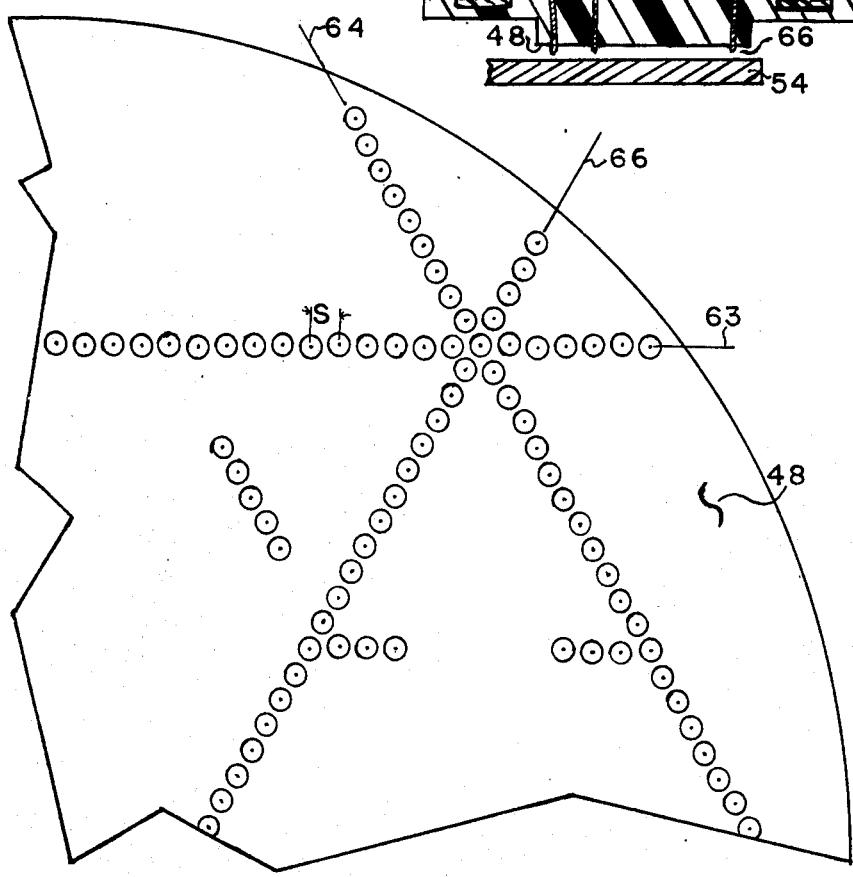
FIG. 4 shows a partial end view of the grid block of FIG. 3.

The number of wires 46 and hence the number of conductors 43 in the block 39 greatly exceeds the number of conductor ends 34 in the cable 13. These wires 46 are evenly distributed at the surface 48 in a pattern (FIG. 4) such that the centers of at least one of the wires 48, which centers constitute sharpened points 62 shall make electrical contact with each of the ends 34 of the conductors under test. This will be true if the distance $s$ between the points 62 in each of the lines 63, 64 forming a grid 66 of such points is no greater than the diameter of one of the ends 34. I prefer, however, that the distance $s$ be no greater than half the diameter of a conductor end 34 so that the entire metal surface of the end of a wire 46 shall be included within the area of an end 34. With No. 19 Awg conductors having a diameter of 0.036 inch (0.91 mm) the distance $s$ is 0.018 inch (0.45 mm) and the wires 46 have a diameter of 0.012 inch (0.3 mm). A grid block 39 with a circular grid 66 1 inch in diameter will have about 2800 of the wires 46 and is evidently an expensive article of precision manufacture.

The mounting of the grid block 39 in the structure 42 is rigid and precise enough for the grid 66 to establish the coordinate system of the apparatus based on the positions of the points 62 relative to the clamp 16, tool carrier 27 and other elements of my apparatus. The coordinates established by the points 62 are ascertainable to the computer because these points form a geometrical pattern which the computer may readily be programmed to decipher. It would also be possible to store the point coordinates in the computer memory. In view, however, of the simplicity of the geometrical arrangement of the points 62 in the grid it is more economical to program the computer to compute the point positions. The computer then selects that point 62 of a wire 46 which is closest, in coordinate value, to the center of each of the ends 34. With the wires 46 free to slide, each of the wires that has not been selected by the computer is pushed back, by means to be described, leaving only a number of points 62, equal to the number of ends 34 to be tested, projecting from the surface 48.

To push back or retract the wires 46 that are not to be connected to the conductors having ends 34 a fourth turret 67 having a fine plunger 68 activated by a solenoid, not shown, is mounted on the shaper tool carrier 27. The grid block 39 is mounted with the lines 63 precisely parallel to the horizontal stroke of the tool carrier and as the plunger 68 reaches each of the coordinates of a point 62 to be retracted it is moved upward vertically, under control of the computer 33, against the point 62 thus pushing the associated wire 46 into one of the bored ends 44. After all of the unneeded points 62 have been pushed back the pistons 58 are automatically activated to compress the layer 49 and lock the wires 46 against further sliding within the block 39. The carrier 27 is retracted and the grid block 39 is automatically lowered against the end 13 thereby connecting each of the conductors of the cable 11 to the panel board 37. The panel board 37 has a number of contacts at least equal to the number of wires 46 and the computer which operates the actual test procedure and is not a novel feature of the present invention is instructed by the computer 33 which of these contacts has been connected. The block 41 has a structure essentially similar to that of the block 39 and is used to connect the ends of the conductors in the cable end 14. In the operation of the plunger 68 in the turret 67 each stroke may cover a line of the points 62 in the grids 66 of both the grid blocks 39 and 41. Alternatively the plunger 68 may be mounted on an apparatus other than the tool carrier 27 so long as it can traverse the grids 66 under direction of the computer 33.

Method of Operation

In the method of testing a cable by means of my novel connecting apparatus the operator has merely to fix a rough cut end of each cable or conductor bundle under test into one of the clamps 16 and prepare the encapsulant 15 in the container 19. Depending on the degree of automation of the actual testing program he may not need to attend the apparatus again except to remove the cable for shipment. The entire test results will appear in a computer print-out and if there are any faulty conductors the print-out will identify them by the coordinates of their centers. The faulty conductors can then be marked by staining or by self-tapping pins inserted endwise after the grid blocks have been raised. The marking step can also be automated by appropriate programming of the computer 33 and the addition of a suitable marking device to the turret head 31.

After the cables or conductor bundles have been clamped in the clamp 16 (FIG. 1a) upon starting the automatic cycle the cable ends 13, 14 are dipped into the encapsulating containers 19 (FIG. 1b) and remain there for a predetermined period sufficient to have the encapsulant harden. The ends are then returned to their upward facing position (FIG. 1c), the turret had 31 turns to fix the coarse cut tool 26 in cutting position and a series of cuts are taken through the plastic cup and the cable ends 13, 14 until only 10 or 15 mils (0.025–0.038 mm) remain above the desired surface. The turret head then turns to place the diamond tool 29 downward and makes the final cuts to produce a smooth polished surface exposing polished ends 34 of the cable conductors within a matrix of conductor insulation and hardened encapsulant.

The photocell 32 is subsequently turned downward by the turret head (FIG. 1e) and the light data from the series of lateral passes of the tool carrier 27 are fed into the computer 33 which calculates and stores the coordinates of the center of each of the conductor ends 34. To increase the light contrast between the copper or aluminum surfaces being scanned by the photoelectric senser (photocell) and the surrounding matrix of conductor insulation and encapsulant I prefer to add a small amount of non-conducting carbon black to the formulation of the encapsulant.

During these operations the grid blocks 39, 41 have been in the elevated position shown in FIG. 1a. Also a brief pulse of hydraulic fluid has been applied through the tubing 53 (FIG. 3) with the plates 54 in position beneath the lower surfaces 48. The plates 54 have then been rotated toward the support 42 out of the path of the tool carrier 27. Now the grid blocks remain in their elevated position while the tool carrier 27 passes beneath them and the plunger 68 (FIG. 1c) rapidly pushes back the wires 48 that are not needed, by making short upward strokes against their points 62. The wires 48 are then locked in position by air pressure through the tubing 61 (FIG. 3). Pressure is maintained until testing has been completed. The grid blocks 39 and 41 are lowered under direction of the computer (FIG. 1f) to a plane where the points 62 that have not been pushed back penetrate the conductor ends 34 in low resistance electrical contact. The conductors of the cable or bundle to be tested are, at this step, all connected to the panel board 37 and the computer which conventionally controls the switching of various test apparatus to the conductors proceeds with the test by switching only to those board contacts that connect to wires whose points 62 have not been pushed back.

As a refinement of my apparatus and method an insulating oil or grease can be applied to the surfaces 28, preferably just before the grid blocks are lowered, to increase the surface resistance between the individual conductor ends 34. This step will have a particular advantage where the testing program includes the application of considerable voltage and the automation of this step merely requires the inclusion of an oil spray mechanism under control of the computer 33.

I have invented a new and useful apparatus and method of which the foregoing description has been exemplary rather than definitive and for which I desire an award of Letters Patent as defined in the appended claims.

I claim:

1. Apparatus for making connection to the individual insulated conductors of a multiconductor cable without separating said individual conductors from one another comprising:
   A. clamping means for holding an end section of a bundle comprising a large plurality of said insulated conductors in a fixed position relative to elements of said apparatus,
   B. a grid comprising a plurality of conductors substantially exceeding in number said plurality of insulated conductors of said bundle, said conductors of said grid being separated from one another, and a substantially planar end section at least equal in size to said section of said bundle, said end section defining a coordinate system,
   C. automatic means for determining the coordinates in said system of the end section of each said conductors in said bundle,
   D. computer means for storing said coordinates,
   E. means controlled by said computer means for selectively removing individual conductors of said grid from said end section of said grid,
   F. means for bringing together said end section of said bundle and said planar section of said grid thereby electrically connecting each of the conductors of said bundle with one conductor of said grid.

2. The apparatus of claim 1 wherein said removing means comprises plunger means and means for urging said plunger means seriatim against the ends of said conductors of said grid.

3. The apparatus of claim 1 comprising means for locking said conductors of said grid against removal from said end section of said grid.

4. The apparatus of claim 1 wherein said conductors of said grid each comprises a length of wire longitudinally displaceable relative to the remainder of said conductor.

5. The apparatus of claim 4 wherein said conductors of said grid each comprises a tubular portion, said portion surrounding a portion of said length of wire in electrical continuity therewith.

6. The apparatus of claim 1 comprising means for returning the ends of conductors of said grid having been removed therefrom to said end section of said grid.

7. The apparatus of claim 6 wherein said returning means comprises a source of fluid pressure.

8. The apparatus of claim 5 comprising an opening through the wall of each said tubular portion and fluid pressure means communicating with said opening.

9. The apparatus of claim 1 wherein said automatic means for determining the conductor coordinates comprises a photoelectric senser.

10. The method of making connection to the individual insulated conductors of a multiconductor cable without separating said conductors from one another comprising the steps of:
    A. cutting and thereby preparing a smooth section of at least an area of said cable, said section including the smooth ends of said conductors,
    B. determining the position of each of said ends within said area and storing the coordinates of said position in a computer memory,
    C. from the planar end section of a conductor grid comprising a plurality of wire contact points exceeding the number of conductor ends in said area, under control of said computer, removing an excess of said wire contact points from said planar end section of said grid so as to leave one of said points opposed to each of said smooth ends of said conductors in said area,
    D. bringing together said grid and said cable section thereby making contact with each of said conductor ends in said area with one of said wire contact points.

11. The method of claim 10 wherein said removing step comprises the pushing back seriatim of said points from said planar end section of said grid.

12. The method of claim 10 wherein said determining step comprises the scanning of said smooth section with a photoelectric senser.

13. The method of claim 10 comprising the step of immersing said area of said cable in an encapsulating liquid and hardening said liquid prior to completing the preparation of said smooth section.

* * * * *